(12) United States Patent
Taylor et al.

(10) Patent No.: US 10,742,322 B1
(45) Date of Patent: Aug. 11, 2020

(54) INFRARED (IR) TRANSMISSION VERIFICATION AND RELAY

(71) Applicant: NCR Corporation, Atlanta, GA (US)

(72) Inventors: Jeremy Cyle Taylor, Cumming, GA (US); Mustafa Abdulelah, Atlanta, GA (US); Nicholas Caine, Cumming, GA (US); John Tatum Dyal, Acworth, GA (US); Andrew Klenzak, Atlanta, GA (US); Brian Patrick Rogers, Roswell, GA (US); Sergio Silva, Atlanta, GA (US); Andrew J. Wurfel, Smyrna, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/368,484

(22) Filed: Mar. 28, 2019

(51) Int. Cl.
*H04B 10/29* (2013.01)
*G06F 16/245* (2019.01)
*H04B 10/66* (2013.01)
*H04B 10/50* (2013.01)

(52) U.S. Cl.
CPC ........... *H04B 10/29* (2013.01); *G06F 16/245* (2019.01); *H04B 10/50* (2013.01); *H04B 10/66* (2013.01)

(58) Field of Classification Search
CPC ........ H04B 10/29; H04B 10/66; H04B 10/50; G06F 16/245
See application file for complete search history.

(56) References Cited

U.S. PATENT DOCUMENTS 10,486,720 B2 * 11/2019 Dulmage ............... B60T 17/228
2018/0027312 A1 * 1/2018 Adiletta .................. G06F 1/183
398/45

* cited by examiner

*Primary Examiner* — Leslie C Pascal
(74) *Attorney, Agent, or Firm* — Schwegman, Lundberg & Woessner

(57) ABSTRACT

A format of an Infrared (IR) transmission from an IR remote is matched to a corresponding IR protocol format for a starting sequence associated with the transmission. Next, a format of a payload that follows the starting sequence in the transmission is matched to a payload format associated with the matched protocol format. Assuming both the starting sequence and the payload formats match, the transmission is relayed and/or replayed over an IR re-transmitter situated in proximity to an IR-enabled device associated with the IR remote, and the IR-enabled device processes a command represented in the payload of the transmission. When either the starting sequence fails to match a supported IR protocol or the payload format fails to match a given supported IR protocol, the transmission is ignored and discarded as unverified.

17 Claims, 5 Drawing Sheets

US 10,742,322 B1

INFRARED (IR) TRANSMISSION VERIFICATION AND RELAY

BACKGROUND

Infrared (IR) communication is ubiquitous in the world of television device control. A popular means to control devices with universal remotes involves the use of the signal record and replay technique. This technique is not concerned with the underlying protocol but rather the storage and retransmission of a collection of signal samples. It is simple and effective but has a number of shortcomings.

The record and replay technique of providing IR device control suffers from two significant shortcomings. The first is its inability to programmatically detect signal errors. When an IR packet is recorded with a universal remote its validity must be manually verified by the individual through playback and observation. The second issue is scalability. The process of recording and storing device functions must be performed for each device and each function. This results in the storage of large collections of device and function sample sets.

SUMMARY

In various embodiments, methods and a device for infrared (IR) transmission verification and relay are presented.

According to an embodiment, a method for IR transmission verification and relay is presented. Starting signals in a wireless transmission are matched to a protocol. A payload format for the protocol is obtained and remaining signals in the wireless transmission are verified against the payload format. Finally, a determination is made as to whether to relay or to ignore the wireless transmission based on the verification of the payload format.

DETAILED DESCRIPTION

Figure 1A:
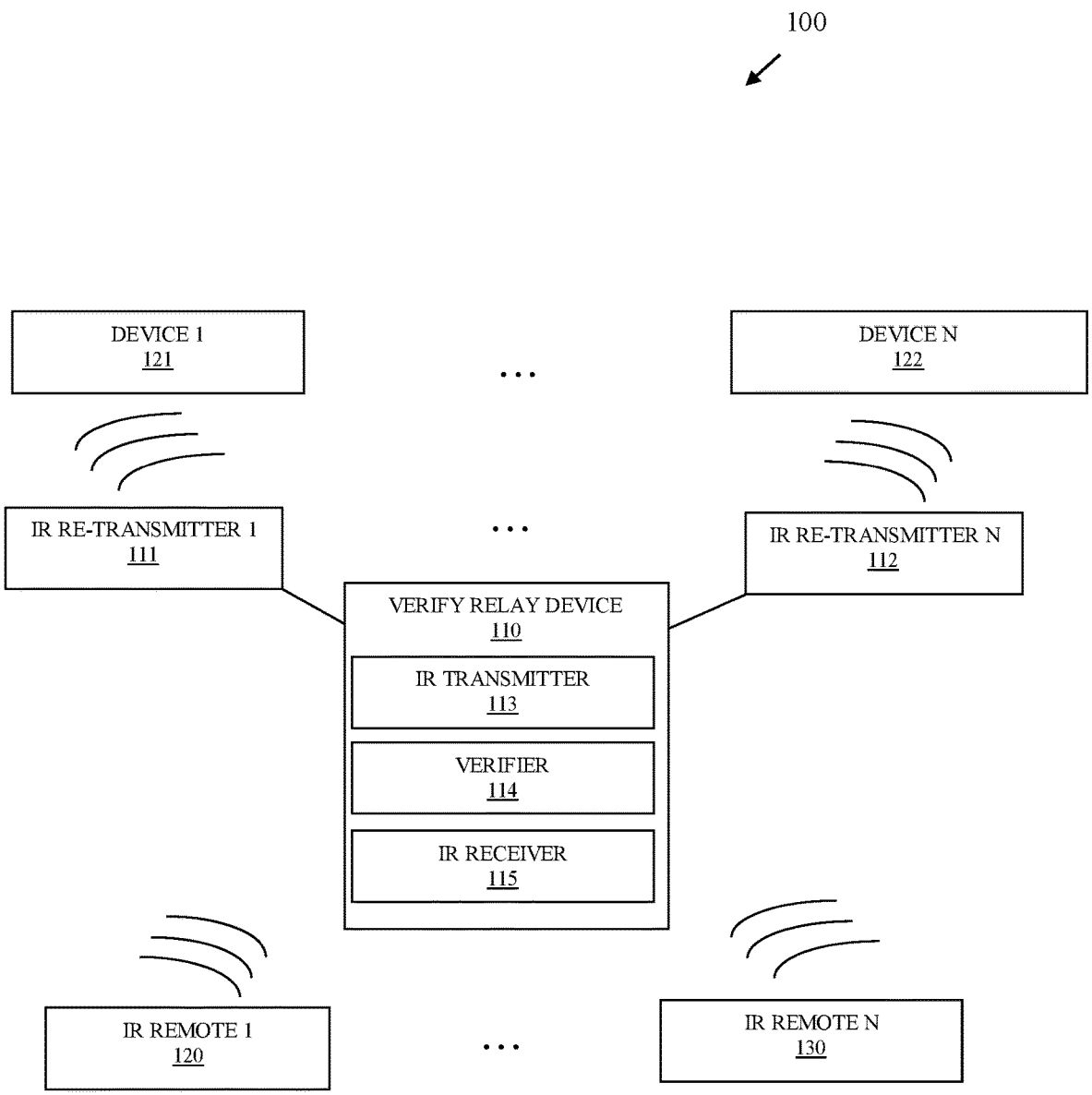
FIG. 1A is a diagram of a system for IR transmission verification and relay, according to an example embodiment.

FIG. 1A is a diagram of a system 100 for IR transmission verification and relay, according to an example embodiment. It is to be noted that the components are shown schematically in greatly simplified form, with only those components relevant to understanding of the embodiments being illustrated.

Figure 1B:
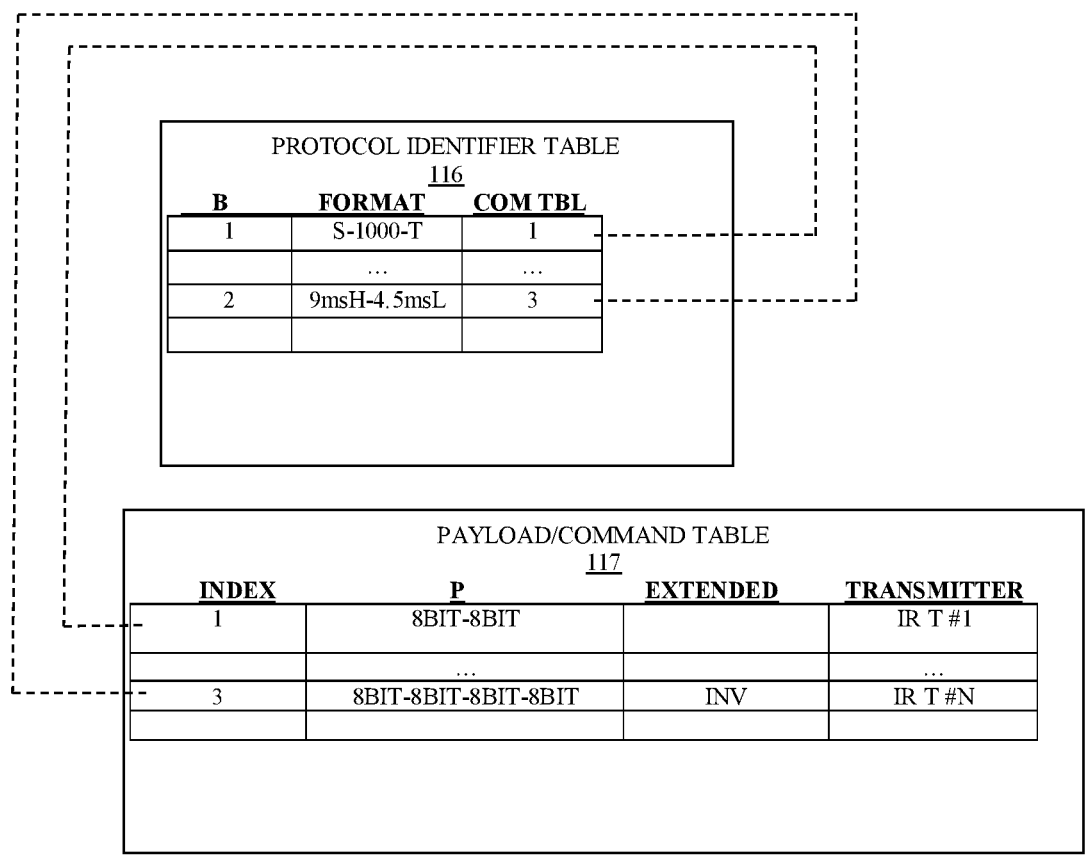
FIG. 1B is a diagram depicting data structures maintained and processed for IR transmission verification and relay, according to an example embodiment.

Furthermore, the various components (that are identified in the FIG. 1) are illustrated and the arrangement of the components is presented for purposes of illustration only. It is to be noted that other arrangements with more or less components are possible without departing from the teachings of IR transmission verification and relay, presented herein and below.

The system 100 includes verify relay device 100 that includes a plurality of IR re-transmitters 111-112, an IR transmitter 113, a verifier 114, and an IR receiver 115. The system 100 also includes a plurality of IR remotes 120-130 that control a plurality of devices 121-122 via IR transmissions of signaling sent from the IR remotes 120-130.

The verify relay device 110 includes a processor, memory, and a non-transitory computer-readable storage medium. The verifier 114 is implemented as executable instructions that reside in the non-transitory computer-readable storage medium. The processor loads the executable instructions from the non-transitory computer-readable storage medium into memory and executes the executable instructions to perform the processing that is discussed herein and below for the verifier 114.

Unfortunately, there is a wide array of IR protocols that are used in the industry with little standardization. A conventional IR relay device merely records transmissions detected and then broadcasts the transmissions over all of the IR transmitters associated with the relay device. IR transmitters are needed in retail settings where a large number of IR-controlled devices are used, such as a television department in a retail store, a sports bar, a hotel, a restaurant, a shopping mall, and others. IR provides wireless signals below the visible spectrum at approximately 950 nm or lower with frequencies between 30 kHz to 60 kHz. As a result, conventional IR remotes need to be in close physical proximity to the IR devices for the devices to detect the signals. In settings where a large number of IR devices are being controlled via a universal remote or via individual remotes use of an IR relay device is necessary; however, conventional IR relay devices cannot verify the IR transmissions for purposes of selecting the appropriate IR transmitter that relays the IR transmission to the appropriate IR device. As a result, the IR relay device simply broadcasts over all its IR transmitters, this can cause some IR devices to respond unexpectedly by processing commands that were not directed to those IR devices, which can cause a great deal of confusion and frustration.

The system 100 and techniques herein provide the verify relay device 110 for verifying IR signaling and selectively relaying only verified IR transmissions over the appropriate and intended IR re-transmitters 111 or 112 via the verifier 114 by re-playing the transmissions through the IR transmitter 113. This allows for customized and accurate control of a plurality of IR-controlled devices 121-122.

Each device manufacturer utilizes its own and sometimes proprietary protocol specification. Each command produced from a remote 120-130 modulates signals in different defined patterns for purposes of identifying one of its devices and issuing a command for the devices 121-122 to process. Some specifications are based on the duration of the signaling; other specifications are based on a length of the signaling (which still may involve some duration of time). All protocol specifications include a start sequence for their transmissions followed by a payload. Some follow the payload with an ending signal sequence. Some payloads include a specific device address/identifier before the command. Some alternate the ending signal sequence from payload to payload signal transmissions. At least a portion of the payload includes an IR command that is being directed to an IR device for processing.

The transition between a high then low transmission and a low then high transmission in an IR signal transmission is considered to be a "mark." Following a mark where there is a break in the signaling is considered to be a "space." The transition from a mark to mark is assigned a bit value of 0 or 1. An extended period of time representing a space is assigned a bit value of 1. In some situations, the timings/ durations of between the marks are different depending upon the protocol specification.

Whether a given mark is given a binary encoding of 0 or 1 may also be protocol specific and in some cases an extended space is associated with a binary encoding value of 1 or 0. That is, the duration of time for a given signal high or low can be assigned differently to binary encoding.

As used herein, a "transmission" represents a plurality of signals (signaling) for a duration of time used by any given IR remote 120 or 130 that uses a given protocol specification to communicate an IR command to an IR device 111 or 112. The pairs of marks and extended spaces over a duration of the transmission are translated into bit values of 0 or 1 to identify the given protocol specification, verify the protocol specification, and verify the format of the payload associated with the transmission. The payload including a valid format for a command that is associated with the given protocol specification.

The verify relay device 110 includes an IR receiver 115 that captures IR transmissions provided by the IR remotes 120-130. Upon receipt of any signaling for a given transmission, the signals are saved in memory and concurrently inspected by the verifier 114 as it is being received to make a determination as to whether the signals in a transmission are associated with a valid protocol specification, which is associated with one of the supported devices 121-122. A plurality of tables 116-117 are used by the verifier 114 to verify both the protocol specification from the starting sequence and the payload (which includes an IR command) from the transmission.

Initially, the verifier 114 may retain different versions of the starting sequence of signals in the transmission. This is because some protocols may assign different binary values to the timing (measured in microseconds) and types of signals (high, low, space). Table 116 includes a column B (for Binary format used) that identifies a number value, which corresponds to that protocol's binary encoding scheme. As the starting sequence of signals of the transmission are received, the verifier 114 performs the binary encoding for the available supported protocols, such that there may be multiple binary strings for which to compare to the format that is being assembled from the starting sequence of signals. Some of the multiple binary encoded versions of the starting sequence of signals for protocols can be eliminated from consideration once a violation in one of their encoding schemes is noted. Once a match to the format column in table 116 is made with the binary encoded string, the protocol associated with that entry in table 116 is used and that protocol's binary encoding scheme is used for verifying the payload format in table 117 on the remaining signals in the transmission that follow the starting sequence.

The verifier 114 inspects a protocol identifier table 116 to determine the format of the transmission that is being simultaneously saved in memory. Table 116 is used to match the format of the starting signals of the transmission to a known IR protocol for one of the devices 121 or 122. A matched format includes an entry that links to an index entry of the payload/command table 117; the index entry in the payload/command table 117 representing a valid expected format for the matched protocol's payload, which includes the IR command recognized by one of the devices 121 or 122. A matched payload format in the payload/command table 117 includes an entry that includes an identifier to a specific one of IR re-transmitters 111 or 112, which is situated in close proximity to the specific device 121 or 122 that is supposed to process the transmitted IR command in the transmission. Assuming the entire format of the transmission is verified in both tables 116 and 117, the IR transmitter 113 plays the saved transmission and the appropriate re-transmitter 111 or 112 relays to the appropriate device 121 or 122, which then processes the command represented in the transmission.

For example, consider RC-6 IR protocol, which defines its start sequence as a long leader pulse/symbol (represented by the S in the first entry of table 116) followed by 4 bits having a value of 1000 and followed by a trailer pulse/symbol (represented by the T in the first entry of table 116). The starting sequence for the RC-6 protocol is defined as S1000T as shown in table 116. When the verifier 114 is able to match a transmission that is being transmitted by one of the remotes 120 or 130 to the RC-6 protocol in table 116, the verifier 114 immediately transitions to index entry 1 of the payload/command table (using the index value provided in table 116 into table 117). Table 117 defines the RC-6 payload format at two separate 8 bit values (8BIT-8BIT in column P for Payload of table 117). Assuming the signaling following the start sequence for the transmissions matches 2 8BIT packets of information, the verifier 114 uses the IR transmitter identifier (IR T #1) located in the RC-6 payload table entry to instruct the IR transmitter 113 to play the saved transmission for IR re-transmitter 111. IR re-transmitter 111 relays the transmission to device 121. Device 121 processes the IR command embedded in the original transmission provided in the RC-6 protocol format.

It is to be noted, that if no starting sequence is matched in table 116, the transmission is not saved and is ignored, so nothing is played to any of the devices. The transmission is believed to be defective if coming from a remote that is not configured to communicate with one of the devices 121 or 122. It is also to be noted that if a starting sequence is matched in table 116 indicating a valid supported protocol but the payload is not verified to a supported payload format in table 117, the transmission is not played to any of the devices. The transmission is believed to be corrupted in some manner.

As another example, consider the NEC IR protocol, which defines its start sequence as 9 ms of high signal (9 msH in table 116) followed by 4.5 ms of low signal (1.5 msL in table 116). A match to a transmission provided by one of the remotes 120 or 130 to this starting sequence provides the verifier 114 with an index value of 3 into table 117 for validating the remaining portions of the transmission's payload for the NEC IR protocol. Entry 3 of table 117 indicates that the payload is expected to be comprised of 4 8 bit values (8BIT-8BIT-8BIT-8BIT in table 117). The NEC IR protocol also has additional extended verification in that the first 8 bits represent the address of the device that the transmission is directed to, the next 8 bits are the first 8 bits inverted, the next 8 bits is the command, the last 8 bits is the command bits inverted. Here, an extended column in table 117 provides a pointer to a verification function called INV. The verifier 114 passes the 32 bit string to the function identified by INV. The function returns a true or false value. True indicates the payload is validated, in which case the verifier 114 instructs the IR transmitter 113 to play the saved transmission over the re-transmitter 112 for device 122 to process the IR command included in the transmission. False indicates that the transmission can be ignored and removed from any saved memory buffer because the transmission is corrupted in some manner.

It is to be noted that a plurality of IR protocols can be supported and embodiments are not constrained to just the RC-6 and NEC protocols used as examples. Furthermore, other exception verification functions may be used beyond just an inversion verification. Each such exception function can be easily deployed via the extended column and a corresponding function to support a customized verification function.

Again, if a match to a starting sequence of an IR transmission does not match to any entry in table 116, then the entire transmission is discarded and is not replayed over either of the re-transmitters 111 or 112. When the starting sequence is matched, the remaining payload sequence has to conform to the format defined in that matched sequence's entry in table 117. If such format for the payload does not match its entry in the table, the entire transmission is discarded from memory and is not replayed over either of the re-transmitters 111 or 112.

In this manner, each IR transmission is verified before it is played to any device 121 or 122 utilizing the tables 116-117 based on a supported IR protocol and its defined starting sequence and payload format. The technique allows for IR command verification for multiple different IR protocol specifications, which has heretofore been elusive in the industry. The technique also allows for custom verification based on specific requirements for each protocol's payload and/or command formats.

In an embodiment, there may be as single re-transmitter 111 or 112 associated with 1 or multiple ones of the IR-controlled devices 121 and 122. That is, there does not have to be a 1-1 mapping between devices 121 and 122 and the re-transmitters 111 and 112, there can be a one to many relationship for 1 re-transmitter 111 to many devices 121 and 122.

As used herein an "IR remote" refers to any device that is capable of transmitting an IR wireless signal.

As used herein an "IR-controlled device" refers to any device that is capable of receiving and responding to an IR wireless signal received from an IR remote.

In an embodiment, the IR remote is a universal remote or specific manufacturer device remote for: televisions, audio devices, and/or audio-visual devices.

In an embodiment, the IR-controlled device includes: televisions, projectors, laptops, audio devices, and others.

In an embodiment, the IR remote is a phone, tablet, or wearable processing device.

In an embodiment, the IR device is also a phone, a tablet, or a wearable processing device.

These and other embodiments are now discussed with reference to the FIGS. 2-4.

Figure 2:
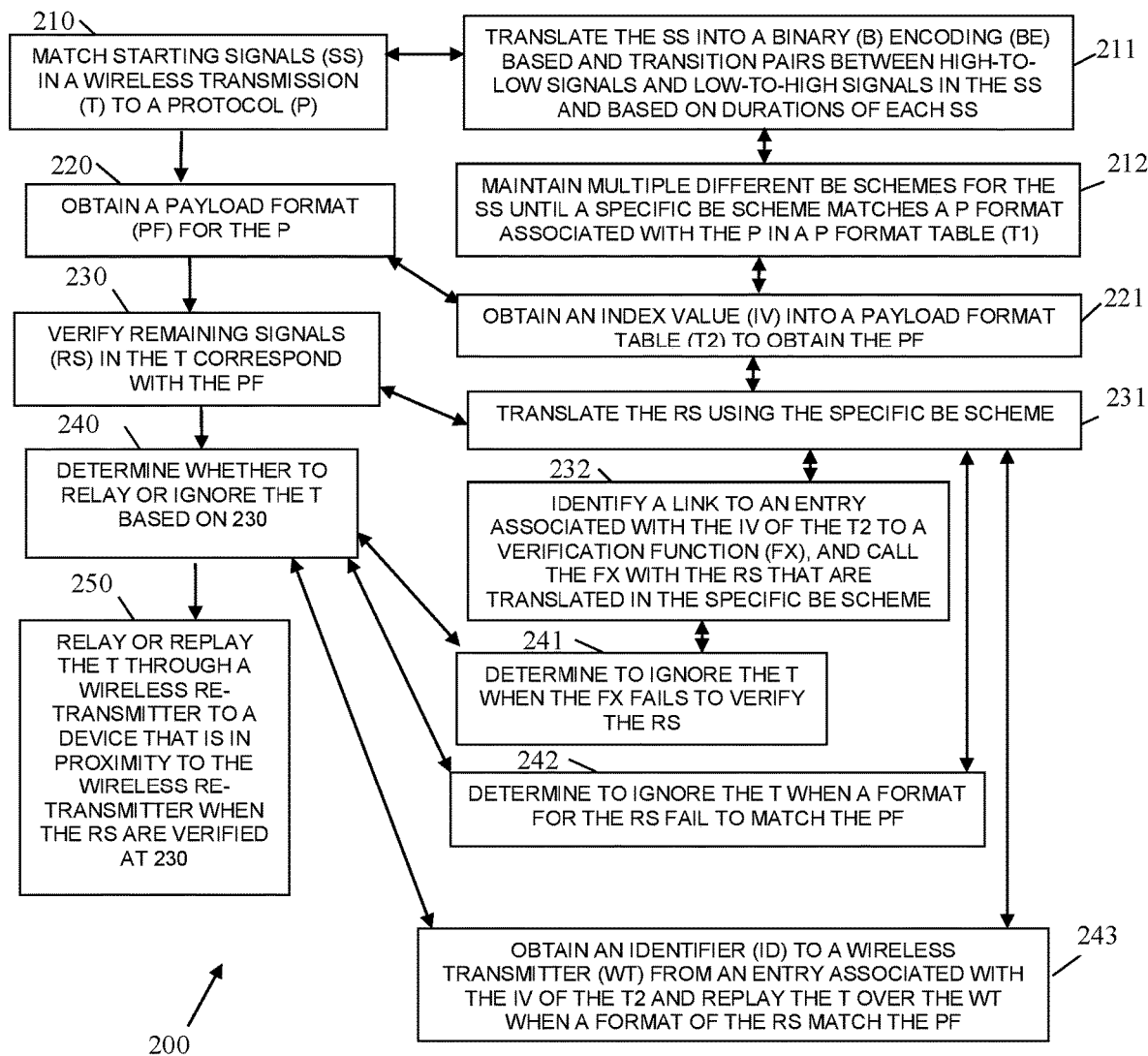
FIG. 2 is a diagram of a method for IR transmission verification and relay, according to an example embodiment.

FIG. 2 is a diagram of a method 200 for IR transmission verification and relay, according to an example embodiment. The software module(s) that implements the method 200 is referred to as an "IR transmission verifier." The IR transmission verifier is implemented as executable instructions programmed and residing within memory and/or a non-transitory computer-readable (processor-readable) storage medium and executed by one or more processors of a device. The processor(s) of the device that executes the IR transmission verifier are specifically configured and programmed to process the IR transmission verifier. The IR transmission verifier may or may not have access to one or more network connections during its processing. The network connections can be wired, wireless, or a combination of wired and wireless.

In an embodiment, the device that executes the IR transmission verifier is the verify relay device 110.

In an embodiment, the device that executes the IR transmission verifier is any IR-based record and replay device that includes the IR transmission verifier.

In an embodiment, the IR transmission verifier is the verifier 114 and utilizes tables 116 and 117 as discussed above with the FIGS. 1A and 1B.

At 210, the IR transmission verifier matches starting signals in a wireless transmission to a protocol. The wireless transmission is received from a wireless remote or another wireless-enabled device.

In an embodiment, at 211, the IR transmission verifier translates the starting signals into a binary encoding based on transition pairs between high-to-low and low-to-high signals in the starting signals and based on durations associated with each starting signal.

In an embodiment, at 212, the IR transmission verifier maintains multiple different binary encoding schemes for the starting signals until a specific binary encoding scheme matches a protocol format associated with the protocol in a protocol format table.

At 220, the IR transmission verifier obtains a payload format that is expected to be present for remaining signals of the wireless transmission for the identified and matched protocol at 210.

In an embodiment of 212 and 220, at 221, the IR transmission verifier obtains an index value into a payload format table to obtain the payload format.

At 230, the IR transmission verifier verifies that the remaining signals in the wireless transmission correspond with the payload format.

In an embodiment of 221 and 230, at 231, the IR transmission verifier translates remaining signals using the specific binary encoding scheme.

In an embodiment of 231 and at 232, the IR transmission verifier identifies a link to an entry associated with the index value of the payload format table to a verification function. The IR transmission verifier calls the verification function with the values of the remaining signals as translated in the specific binary encoding scheme.

At 240, the IR transmission verifier determines whether to relay or ignore the wireless transmission based on the verification at 230.

In an embodiment of 232 and 240, at 241, the IR transmission verifier determines to ignore the wireless transmission when the verification function fails to verify the bit values of the remaining signals. This is even when the format of the remaining signals matched the payload format.

In an embodiment of 231 and 240, at 242, the IR transmission verifier determines to ignore the wireless transmission when a format for the remaining signals fails to match the payload format.

In an embodiment of 231 and 240, at 243, the IR transmission verifier obtains an identifier to a wireless transmitter from an entry associated with the index value of the payload format table and replays the transmission over the wireless transmitter when a format of the remaining signals matches the payload format.

In an embodiment, at 250, the IR transmission verifier relays or replays the original wireless transmission through a wireless re-transmitter to a device that is in proximity to the wireless re-transmitter when the remaining signals of the wireless transmission were verified at 230.

Figure 3:
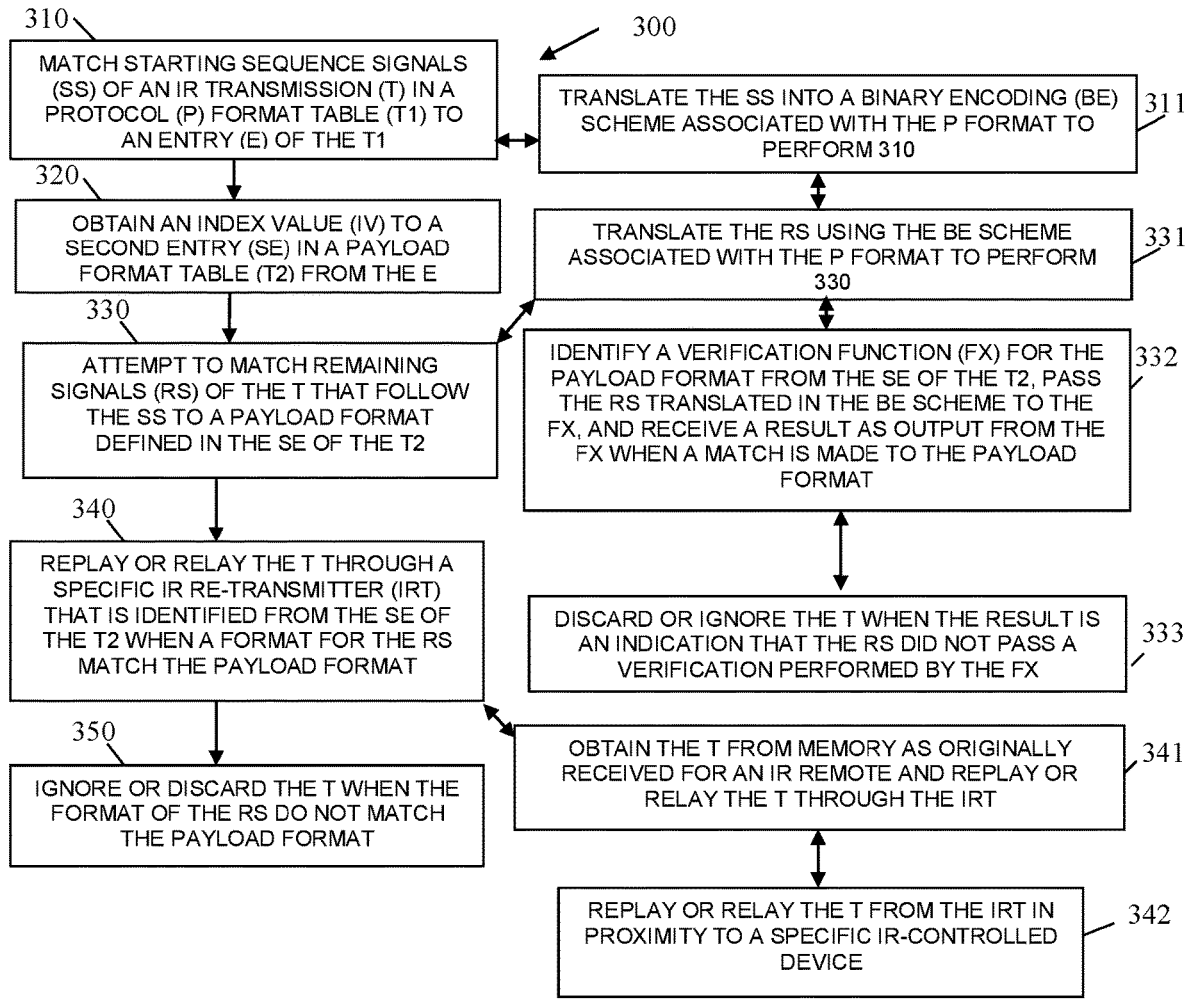
FIG. 3 is a diagram of another method for IR transmission verification and relay, according to an example embodiment.

FIG. 3 is a diagram of another method 300 for IR transmission verification and relay, according to an example embodiment. The software module(s) that implements the method 300 is referred to as an "IR verifier." The IR verifier is implemented as executable instructions programmed and residing within memory and/or a non-transitory computer-readable (processor-readable) storage medium and executed by one or more processors of a device. The processors that execute the IR verifier are specifically configured and programmed to process the IR verifier. The IR verifier may or may not have access to one or more network connections during its processing. The network connections can be wired, wireless, or a combination of wired and wireless.

In an embodiment, the device that executes the IR verifier is the verify relay device 110.

In an embodiment, the device that executes the IR verifier is any IR record and replay device that includes the IR verifier.

In an embodiment, the IR verifier is all or some combination of: the verifier 114 utilizing tables 116 and 117, and/or the method 200.

At 310, the IR verifier matches starting sequence signals of an IR transmission in a protocol format table to an entry of the table.

In an embodiment, at 311, the IR verifier translates the starting sequence signals into a binary encoding scheme that is associated with the protocol format in order to perform the matching at 310.

At 320, the IR verifier obtains an index value to a second entry in a payload format table from the matched entry in the protocol format table.

At 330, the IR verifier attempts to match remaining signals of the IR transmission that follow the starting sequence signals to a payload format defined in the second entry of the payload format table.

In an embodiment of 311 and 330, at 331, the IR verifier translates the remaining signals using the binary encoding scheme associated with the protocol format in order to perform the matching at 330 to the second entry in the payload format table.

In an embodiment of 331 and at 332, the IR verifier identifies a verification function for the payload format from the second entry of the payload format table. The IR verifier pass the remaining signals translated in the binary encoding scheme to the verification function, and the IR verifier receives a result as output from the verification function when a match is made to the payload format. That is, the verification function is called after the remaining signals are determined to have matched to the payload format defined in the second entry of the payload format table as an additional form of verification.

In an embodiment of 332 at 333, the IR verifier discards or ignores the IR transmission when the result is an indication that the remaining signals did not pass the verification performed by the verification function at 332.

At 340, the IR verifier replays or relays the original IR transmission through a specific IR re-transmitter that is identified from the second entry of the payload table when a format for the remaining signals match the payload format (assuming there was no additional verification that was needed as defined in the second entry, such as was discussed above at 332 and 333).

In an embodiment, at 341, the IR verifier obtains the IR transmission from memory as originally received from an IR remote and the IR verifier replays or relays the transmission through the specific IR re-transmitter.

In an embodiment of 341 at 342, the IR verifier relays or relays the IR transmission from the specific IR re-transmitter to specific IR-controlled device.

In an embodiment, at 350, the IR verifier ignores or discards the IR transmission when the format of the remaining signals do not match the payload format for the originally matched protocol and its protocol format.

Figure 4:
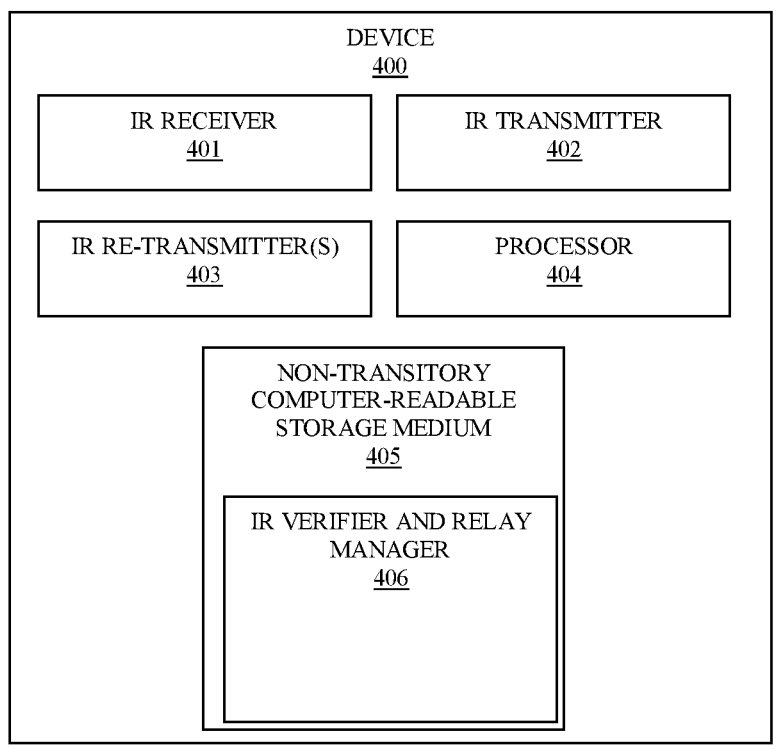
FIG. 4 is a diagram of a device for IR transmission verification and relay, according to an example embodiment.

FIG. 4 is a diagram of a device 400 for IR transmission verification and replay, according to an example embodiment. The device 400 includes a variety of hardware components and software components. The software components of the device 400 are programmed and reside within memory and/or a non-transitory computer-readable medium and execute on one or more processors of the device 400. The device 400 may or may not communicate over one or more networks, which can be wired, wireless, or a combination of wired and wireless.

In an embodiment, the device 400 implements, inter alia, the processing described above with the FIGS. 1A-1B and 2-3.

The device 400 includes an IR receiver 401, an IR transmitter 402, a plurality of IR relays/re-transmitters 403, a processor 404, a non-transitory computer-readable storage medium 405 having executable instructions representing an IR verifier and relay manager 406.

The IR verifier and relay manager 406 when executed from the non-transitory computer-readable storage medium 405 by the processor 404 is configured to cause the processor 404 to: 1) attempt to match starting signals for an IR transmission received by the IR receiver 401 to a specific IR protocol format from a plurality of available IR protocol formats; 2) match remaining signals of the IR transmission that follow the starting signals to a payload format defined for the specific IR protocol format when the starting signals match the specific IR protocol format; 3) discard and ignore the IR transmission when either the starting signals fail to match any of the plurality of available IR protocol formats or the remaining signals are in a format that does not correspond to the payload format for the specific IR protocol format; and 4) instruct the IR transmitter 402 to play the IR transmission as originally received over a specific one of the IR re-transmitters 403 when the starting signals match the specific IR protocol format and when the format of the remaining signals match the payload format for the specific IR protocol format.

In an embodiment, the IR verifier and relay manager 406 when executed from the non-transitory computer-readable storage medium 405 by the processor 404 is further configured to cause the processor 404 to: process a verification function that is specific to the specific IR protocol format on values associated with the remaining signals as a further verification when the format of the remaining signals match the payload format.

In an embodiment, the IR verifier and relay manager 406 performs the processing discussed above with respect to the verifier 114 utilizing tables 116 and 117, the method 200, and/or the method 300.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
matching starting signals in a wireless transmission to a protocol, wherein matching further includes translating the starting signals into a binary encoding based on transition pairs between high-to-low and low-to-high signals provided in the starting signals and based on durations of each starting signal, wherein translating further includes maintaining multiple different binary encoding schemes for the starting signals until a specific binary encoding scheme matches a protocol format associated with the protocol in a protocol format table;
obtaining a payload format for the protocol, obtaining an index value into a payload format table from a protocol format table entry for the protocol to obtain the payload format;
verifying remaining signals in the wireless transmission correspond with the payload format; and
determining whether to relay or to ignore the wireless transmission based on the verifying.

2. The method of claim 1, wherein verifying further includes translating the remaining signals using the specific binary encoding scheme.

3. The method of claim 2, wherein translating further includes identifying a link to an entry associated with the index value of the payload format table to a verification function, and calling the verification function with the remaining signals that are translated in the specific binary encoding scheme.

4. The method of claim 3, wherein determining further includes determining to ignore the wireless transmission when the verification function fails to verify the remaining signals.

5. The method of claim 2, wherein determining further includes determining to ignore the wireless transmission when a format for the remaining signals fails to match the payload format.

6. The method of claim 2, wherein determining further includes obtaining an identifier to a wireless transmitter from an entry associated with the index value of the payload format table and replaying the wireless transmission over the wireless transmitter when a format of the remaining signals match the payload format.

7. The method of claim 1 further comprising, relaying or replaying the wireless transmission through a wireless re-transmitter to a device that is in proximity to the wireless re-transmitter when the remaining signals are verified.

8. A method, comprising:
matching starting sequence signals of an Infrared (IR) transmission in a protocol format table to a specific IR protocol in an entry of the protocol format table;
obtaining an index value to a second entry in a payload format table from the entry;
attempting to match remaining signals of the IR transmission that follow the starting sequence of signals to a payload format defined in the second entry of the payload format table; and
replaying or relaying the IR transmission through a specific IR re-transmitter that is identified from the second entry of the payload format table when a format for the remaining signals match the payload format.

9. The method of claim 8 further comprising ignoring and discarding the IR transmission when the format of the remaining signals does not match the payload format.

10. The method of claim 8, wherein matching further includes translating the starting sequence of signals into a binary encoding scheme associated with the protocol format to perform the matching.

11. The method of claim 10, wherein attempting further includes translating the remaining signals using the binary encoding scheme associated with the protocol format to perform the attempting.

12. The method of claim 11, wherein translating further includes identifying a verification function for the payload format from the second entry of the payload format table, passing the remaining signals translated in the binary encoding scheme to the verification function, and receiving a result as output from the verification function when a match is made to the payload format.

13. The method of claim 12, wherein identifying further includes discarding and ignoring the IR transmission when the result is an indication that the remaining signals did not pass a verification performed by the verification function.

14. The method of claim 13, wherein replaying or relaying further includes obtaining the IR transmission from memory as received from an IR remote and replaying or relaying through the specific IR re-transmitter.

15. The method of claim 14, wherein obtaining further includes replay or relay the IR transmission from the specific IR re-transmitter in proximity to a specific IR-controlled device.

16. A device, comprising:
an Infrared (IR) receiver;
an IR transmitter;
one or more IR re-transmitters;
a processor;
a non-transitory computer-readable storage medium having executable instructions representing an IR verifier and relay manager; and
the IR verifier and relay manager when executed by the processor from the non-transitory computer-readable storage medium cause the processor to:
attempt to match starting signals for an IR transmission received by the IR receiver to a specific IR protocol format from a plurality of available IR protocol formats;
match remaining signals of the IR transmission that follow the starting signals to a payload format defined for the specific IR protocol format when the starting signals match the specific IR protocol format;
discard and ignore the IR transmission when either the starting signals fail to match any of the plurality of available IR protocol formats or the remaining signals are in a format that does not correspond to the payload format for the specific IR protocol format; and
instruct the IR transmitter to play the IR transmission as originally obtained when the starting signals match the specific IR protocol format and when the format of the remaining signals match the payload format for the specific IR protocol format.

17. The device of claim 16, wherein the IR verifier and relay manager are further configured to: process a verification function that is specific to the specific IR protocol format on values associated with the remaining signals as a further verification when the format of the remaining signals match the payload format.

\* \* \* \* \*